(12) United States Patent
Gaucher et al.

(10) Patent No.: US 10,543,815 B2
(45) Date of Patent: Jan. 28, 2020

(54) ADAPTER FOR CONNECTING THE FREE END OF A WIPER ARM, AND ASSEMBLY COMPRISING AN ADAPTER AND A WIPER ARM

(71) Applicant: Valeo Systèmes d'Essuyage, Le Mesnil Saint Denis (FR)

(72) Inventors: Vincent Gaucher, Le Mesnil Saint Denis (FR); Stéphane Houssat, Le Mesnil Saint Denis (FR); Olivier Jomard, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 222 days.

(21) Appl. No.: 15/466,926

(22) Filed: Mar. 23, 2017

(65) Prior Publication Data

US 2017/0274872 A1 Sep. 28, 2017

(30) Foreign Application Priority Data

Mar. 25, 2016 (FR) ...................................... 16 52625

(51) Int. Cl.
*B60S 1/40* (2006.01)

(52) U.S. Cl.
CPC ........... *B60S 1/4006* (2013.01); *B60S 1/4016* (2013.01); *B60S 1/4019* (2013.01); *B60S 2001/4022* (2013.01); *B60S 2001/4032* (2013.01)

(58) Field of Classification Search
CPC .... B60S 1/4006; B60S 1/4016; B60S 1/4019; B60S 2001/4012; B60S 2001/4022; B60S 2001/4032

USPC ....................................................... 15/250.32
See application file for complete search history.

(56) References Cited

U.S. PATENT DOCUMENTS

2009/0293218 A1  12/2009  Fujiwara
2014/0352097 A1  12/2014  Cox et al.

FOREIGN PATENT DOCUMENTS

| CN | 1747862 A | 3/2006 |
| CN | 102985301 A | 3/2013 |
| DE | 3025734 A1 | 2/1982 |
| DE | 4127101 | * 2/1993 |

(Continued)

OTHER PUBLICATIONS

Machine translation of description portion of German publication 4127101, published Feb. 1993. (Year: 1993).*

(Continued)

*Primary Examiner* — Gary K. Graham
(74) *Attorney, Agent, or Firm* — Osha Liang LLP (57) ABSTRACT

An adapter for connecting a wiper blade to a U-shaped front end hook of a wiper arm includes a front body with convex external profile, configured to be received in a concave front closed-end of the end hook, at least one branch which extends longitudinally towards the rear from the front body and which carries a single projecting locking stud intended to be received in a locking slot of the end hook, of the wiper arm, and at least two transverse notches for the longitudinal positioning of the adapter. The at least two notches are longitudinally offset relative to one another. One or another of the at least two notches collaborates with a transverse edge of the end hook according to a dimension of the end hook. The locking stud is configured to push against the end hook in a first longitudinal direction.

16 Claims, 4 Drawing Sheets

(56) References Cited

FOREIGN PATENT DOCUMENTS

| EP | 0329515 A1 | 8/1989 |
| EP | 0528307 A1 | 2/1993 |
| GB | 2034175 A | 6/1980 |
| JP | S62 5817 B2 | 2/1987 |
| KR | 20090030949 A | 3/2009 |

OTHER PUBLICATIONS

Preliminary Report Issued in Corresponding French Application No. 1652625, dated Nov. 23, 2016 (6 Pages).
First Office Action in corresponding Chinese Application No. 201710325027.1, dated Jan. 29, 2019 (11 pages).

\* cited by examiner

ADAPTER FOR CONNECTING THE FREE END OF A WIPER ARM, AND ASSEMBLY COMPRISING AN ADAPTER AND A WIPER ARM

TECHNICAL HELD OF THE INVENTION

The invention relates to an adapter, also known as a connecting piece, used for connecting the free end of a wiper arm to an element of a support structure supporting a blade rubber of a wiper blade.

The invention also relates to an assembly comprising such an adapter and a wiper arm.

BACKGROUND OF THE INVENTION

The invention relates more particularly to an adapter for connecting a U-shaped hooked end of the wiper arm to a pivot pin extending transversely between two parallel lateral flanges of the blade rubber support element, this support element being produced, for example, in the form of a main articulation yoke.

According to a known design of such a connecting adapter, it comprises two parallel lateral wings the vertical external faces of which are designed to be received transversely between the facing opposing vertical internal faces of parallel lateral flanges of the support element and the facing internal faces of which are designed to collaborate with the parallel and vertical lateral edges of the end hook of the wiper arm.

In such a design, the parallel wings are connected to one another by a front transverse body which is extended longitudinally towards the rear by two opposite branches and which delimits a bearing housing into which the pivot pin can be introduced.

The front body is delimited by a convex external cylindrical surface which is received in a complementary concave closed-end of the U-shaped hook of the end of the wiper arm.

Such a type of adapter is satisfactory and notably allows a wiper blade to be mounted in a simple way on the U-shaped hooked free end of the wiper arm.

In a known way, the main part of the body of the wiper arm and the U-shaped hooked end portion thereof are produced in the form of a bent metal bar of rectangular cross section the transverse width of which corresponds more or less to the distance separating the facing and opposing internal faces of the parallel wings of the adapter.

However, such a design of an adapter does not allow the one same adapter to be used for mounting a wiper blade on wiper arms of different sizes, particularly when the longitudinal dimensions of the U-shaped hooked end portion vary from one wiper arm to another.

In order notably to be adaptable to at least three ranges of different sizes of the hook-shaped end of a wiper arm, document US-A1-2014/0352097 proposes a design for an adapter comprising a body intended to be received in a concave closed-end of the end hook and a locking branch which extends longitudinally from the front body and which carries a series of three projecting looking studs each of which is intended to be received in a locking slot of the end hook of the wiper arm, according to the dimensions of the end hook.

Such a design has a notable disadvantage of increasing the overall height of the adapter which, depending on the dimensions of the end hook, leads either to a significantly-sized part of the locking tab being situated outside the hook, or to the adapter being mounted inside the hook with significant vertical compression.

The invention seeks to propose an adapter, notably one of small dimensions, which allows a wiper blade to be mounted on at least two wiper arms which have different dimensions for the U-shaped hooked free end portion.

BRIEF SUMMARY OF THE INVENTION

The invention proposes an adapter for connecting a wiper blade to a U-shaped hooked front end of a wiper arm, the adapter comprising:

a front body with convex external profile, intended to be received in a concave front closed-end of the end hook;

and at least one branch which extends longitudinally towards the rear from the front body and which carries a single projecting locking stud intended to be received in a locking slot of the end hook of the wiper arm, characterized in that the adapter comprises at least two transverse notches for the longitudinal positioning of the adapter, these being longitudinally offset relative to one another and one or another of which is intended to collaborate with a rear transverse edge of the end hook according to the dimensions of the end hook.

According to other features of the invention:

the adapter comprises at least one elastically deformable positioning tab, and at least two positioning notches are carried by the positioning tab;

the positioning tab is an elastically deformable beam which pivots about an axis orthogonal to the longitudinal direction of the adapter;

the positioning tab extends longitudinally towards the rear, and at least two positioning notches are formed near a rear free end of the positioning tab;

the positioning tab extends longitudinally in the continuation of the branch of the adapter that carries the locking stud;

the adapter comprises two parallel lateral wings between which the front body extends transversely and the mutually-facing internal faces of which are designed to collaborate with external lateral faces of the end hook, and the branch and the positioning tab extend longitudinally between these internal faces;

the adapter comprises two parallel lateral wings between which the front body extends transversely and the mutually-facing internal faces of which are designed to collaborate with external lateral faces of the end hook, and the positioning tab extends longitudinally in the continuation of one of these wings;

each of the two wings is extended longitudinally towards the rear by a positioning tab;

the locking stud is delimited by a transverse thrust face oriented longitudinally towards the rear;

each positioning tab carries at least three positioning notches that are longitudinally offset relative to one another;

the front body comprises an elastic element intended to be mounted elastically compressed against a facing portion of the concave closed-end of the end hook;

the adapter is produced as a single piece as a plastic moulding.

The invention also proposes an assembly comprising a wiper arm comprising a U-shaped hooked front end and an adapter according to the invention, characterized in that a portion of the end hook of the wiper arm is positioned longitudinally without play between, on the one hand, a transverse thrust face oriented longitudinally towards the rear of the locking stud and, on the other hand, one of the said positioning notches.

According to another feature of the assembly, the locking slot is delimited longitudinally towards the rear by a transverse dge which is kept by the said at least one elastic tab pressed longitudinally against the transverse thrust face of the locking stud.

BRIEF DESCRIPTION OF THE FIGURES

Further features and advantages of the invention will become apparent during the course of reading the following detailed description for an understanding of which reference will mo be made to the attached drawings in which.

DETAILED DESCRIPTION OF THE FIGURES

In the remainder of the description, elements exhibiting an identical structure or similar functions will be denoted by the same references, In the remainder of the description, longitudinal, vertical and transverse orientations will be adopted, nonlimitingly and without reference to the Earth's gravitational field, as indicated by the "L, V, T" trihedron in the figures. A horizontal plane extending longitudinally and transversely is also defined.

Figure 1:
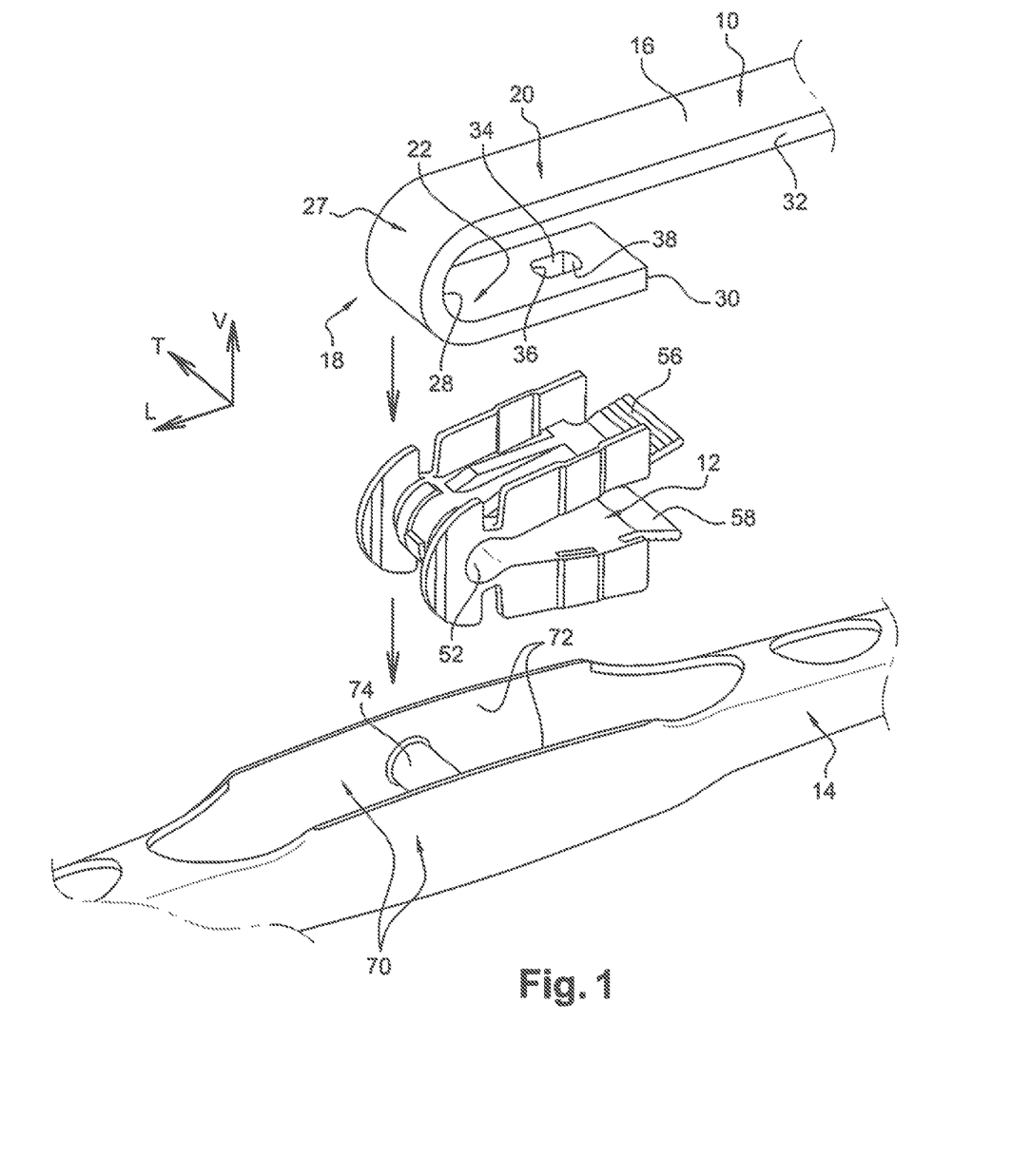
FIG. 1 is an exploded perspective view depicting an assembly according to a design of the prior art consisting of a wiper arm, an adapter, and a main yoke for the articulation of a blade rubber.

FIG. 1 depicts a portion of a wiper arm 10, also referred to as drive arm, which is associated with an adapter 12 for the mechanical connection of the wiper arm 10, in this instance, to a main support yoke 14 for a blade rubber (not depicted) of a wiper.

Figures 2, 3:
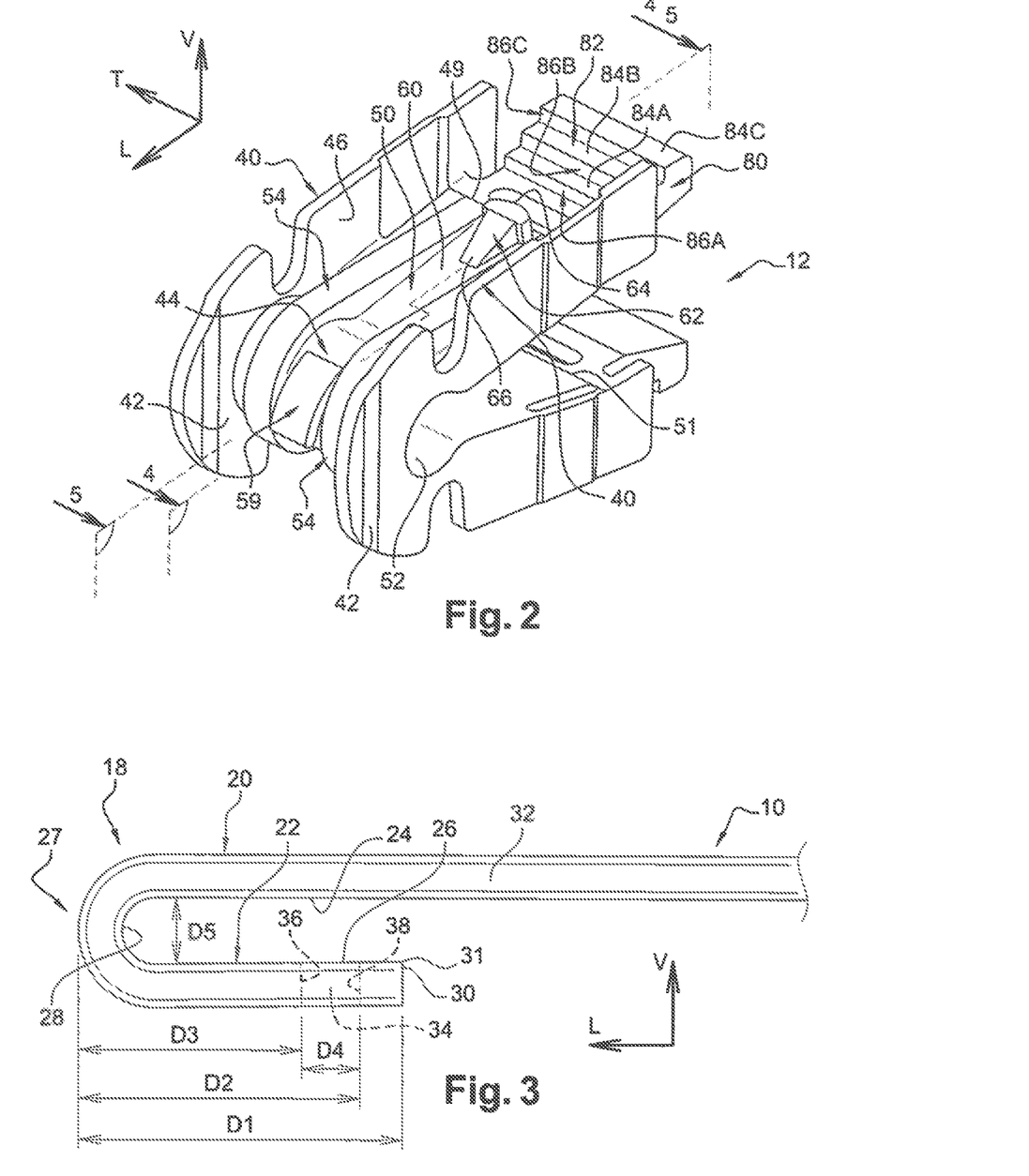
FIG. 2 is a large scale perspective view (viewed from beneath) of an adapter of the kind depicted in FIG. 1 according to a first embodiment of the invention.
FIG. 3 is a large scale detailed side view of the U shaped hooked front end portion of the wiper arm illustrated in FIG. 1.

The longitudinal front part of the wiper arm 10 depicted notably in FIGS. 1 and 2 extends the main body 16 of the wiper arm 10 and is shaped into a U-shaped hook 18.

The U-shaped hooked free end part 18 is made up of a horizontal upper strand 20, of a horizontal lower strand 22, each of which is delimited by a planar horizontal face 24, 26 respectively.

The two parallel horizontal strands 20 and 22 are connected to one another by a curved front longitudinal end strand 27 shaped into a semi-cylindrical arch which internally delimits a concave semi-cylindrical closed end 28.

The lower portion 22 is delimited longitudinally towards the rear by a transverse and vertical rear end face 30.

As is known, near the rear end face 30, the lower strand 22 comprises a locking slot 34 which hi this instance is an open vertical hole longitudinally delimited by a front end edge 36 and by a rear end edge 38 each of which is shaped with a concave rounded profile.

In the known way, the wiper arm 10 and notably its U shaped hooked front end portion 18 is produced in the form of a metal bar of rectangular (in this instance with rounded corners) transverse cross section which is cut and bent and which is delimited transversely by two external vertical lateral faces 32.

Of some of the characteristic dimensions of the end portion 18, FIG. 3 indicates the longitudinal distance D1 that separates the front longitudinal end edge of the bent-over strand 27 from the rear transverse end face 30 of the strand 22; the distance D2 that separates this edge from the rear end edge 38 of the locking slot 34; the distance D3 that separates this edge from the front end edge 36 of the locking slot 34: the longitudinal distance D4 that separates the two, front 36 and rear 38, end edges of the locking slot 34; as well as the vertical distance D5 that separates the facing and opposing horizontal faces 24 and 26, this distance D5 corresponding more or less to the diameter of the concave closed-end of circular semi-cylindrical profile 28 of the bent-over strand 27.

As may be seen notably in FIGS. 1 and 2, the adapter 12 here is a component that is moulded as a single piece as a plastic moulding and which comprises two opposing longitudinal and vertical lateral wings 40 which, near their front free ends that have a convex rounded profile 42, are joined together by a front body 44 with convex cylindrical overall shape which extends transversely between facing portions of the opposing internal faces 46 of the lateral wings 40.

The front body 44 is extended longitudinally towards the rear by two substantially horizontal longitudinal branches these being an upper branch 48 and a lower branch 50 that form a V.

Like the front body 44, the two, upper 48 and lower 50, branches extend transversely between facing portions of the opposed internal lateral faces 46 of the lateral wings 40.

The front body 44 is internally hollowed and delimits a concave circular cylindrical internal housing 52 of geometric axis A which is able to receive so that it rotates a pivot rod 74 with complementary profile and dimensions, in this instance belonging to the articulation yoke 14.

The front body 44 and the branches 48 and 50 here comprise two raised external ribs 54 of longitudinal overall orientation and which are parallel.

These are reinforcing ribs so that, without being damaged, the adapter 12 takes the form of a "clip" with two branches 48 and 50 which is elastically deformable with respect to its state of rest depicted notably in FIGS. 1 and 2, so that the two branches 48 and 50 can be brought vertically closer together or further apart.

According to the prior art, near its rear longitudinal end 49, 51 respectively each branch 48, 50 comprises a gripping tag 56, 58 so that, by acting on at least one tag, the adapter 12 can be deformed by bringing the branches 48 and 50 vertically closer together as mentioned hereinabove.

On its external face 60, the lower branch 50 comprises a single locking stud 62 which is formed as a projection and which extends overall vertically downwards.

The locking stud 62 is dimensioned in such a way that it can, with clearance, penetrate vertically downwards inside the locking slot 34.

The locking stud 62 is delimited longitudinally towards the rear by a transverse thrust face 64 of convex rounded profile which is oriented longitudinally towards the rear and which is able to collaborate with the rear end edge 38 of the locking slot 34.

On its convex external surface, the front body 44 comprises a spring-forming elastic leaf 59 which is able to collaborate with a facing portion of the concave closed end 28 of the curved strand 27 of the U-shaped hooked end portion 18 of the wiper arm 10.

When the adapter 12 is in the mounted position, mounted inside the U-shaped hooked end portion 18, the spring-forming leaf 59 is mounted longitudinally compressed so as to exert longitudinally towards the rear a force that tends to press the rear transverse thrust face 64 of the locking stud 62 firmly against the rear edge 38 of the locking slot 34.

The main yoke 14, depicted by way of nonlimiting example in FIG. 1, in this instance is a component for example made of cut and bent sheet metal the central part of which is essentially made up of two vertical and longitudinal parallel flanges 70 each of which is delimited by an internal vertical face 72 between which there extends transversely a pivot rod 74 which is able to be received in the housing 52 of the front body 44 of the adapter 12.

In the known way, assembly is performed here by first of all fitting the adapter 12 onto the pivot rod 74 by pushing the latter longitudinally from the back forwards into the housing 52 and then by fitting the U-shaped hooked end portion 18 of the wiper arm 10 in which the adapter 12 is longitudinally fitted, from the rear forwards, unto the locking stud 62 enters and fits into the locking slot 34.

This operation is performed by slightly compressing the spring-forming leaf 59 and is made easier by the inclined-ramp-shaped front profile 66 of the locking stud 62 which collaborates with a facing rear upper horizontal transverse edge 31 of the lower strand 22 in order to cause at least the lower branch 50 to deform elastically.

When there is a wish to dismantle, and therefore to unlock the U-shaped hooked end portion 18 of the wiper arm 10 from the adapter 12, the operator needs to act on the branch, in this instance the lower branch 50, that carries the stud 62 in order to deform it vertically upwards and cause it to exit the locking slot 34, by acting on the tag 58 in order to achieve this.

In this design according to the prior art, with the exception of the locking stud and of the spring-forming leaf, the adapter exhibits dual overall symmetry of design, first of all with respect to a longitudinal vertical mid plane and, secondly, with respect to a horizontal longitudinal mid plane.

The first embodiment of an adapter according to the invention as illustrated notably in FIGS. 4A to 4C will now be described with reference and by comparison to that which was described in relation to an adapter 12 according to the prior art, as illustrated in FIG. 1.

In the description of the embodiments according to the invention, the overall design of the wiper arm 10 with its U-shaped hooked end portion is identical to that described previously with reference to the prior art.

The design of the adapter 12 according to the invention is characterized by the modifications made to the rear end portion of the lower branch 50—which carries the locking stud 62—which takes the form of an elastically deformable tab 80 providing longitudinal positioning and compensating for play to make it possible, by means of one and the same adapter 12, to connect in this instance three wiper arms 10 the U-shaped hooked front end portion 18 of which has different dimensions, notably in so far as the longitudinal dimensions D1, D2 and D3 are concerned.

To this end, the lower branch 50 is extended longitudinally towards the rear from its rear end edge 49 by a tab 80 which is configured as an elastically deformable beam which can pivot about a transversely oriented axis B which is situated longitudinally substantially in line with the edge 49.

The lower face 82 of the positioning tab 80 has a threes step staircase profile with the steps longitudinally offset towards the rear relative to one another and vertically offset from one another downwards from front to rear.

These three steps here form a group which is longitudinally offset towards the rear with respect to the locking stud 62.

Each of the three steps 84A, 84B, 84C is delimited longitudinally towards the front by a vertical transverse face 86A, 86B, 86C which constitutes a notch, oriented forwards, able to collaborate with a facing portion of the transverse rear end face 30 of the lower strand 22 of the U-shaped hooked end portion 18 of the wiper arm 10.

Figure 4A:
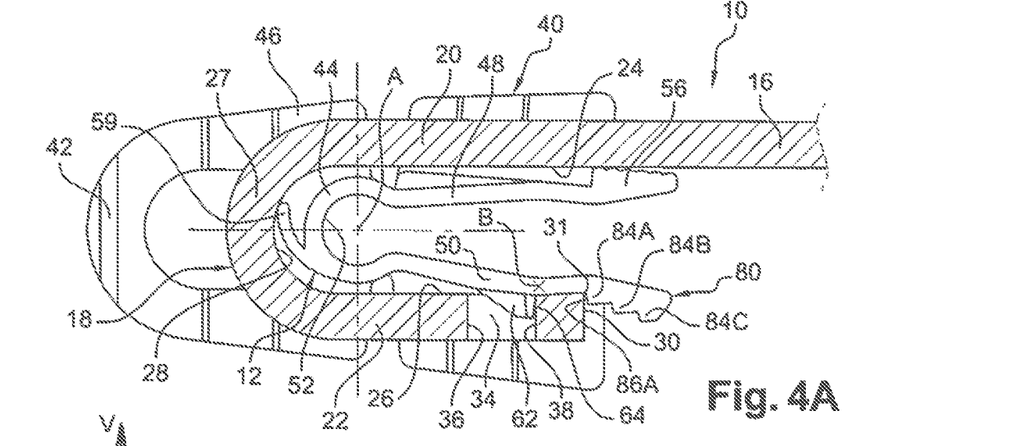
FIG. 4A is a view in section, on the plane 4-4 of FIG. 2, which illustrates the adapter depicted in FIG. 2 in a mounted position mounted in a U-shaped hooked end portion of a wiper arm of a first series of sizes.
Figure 4B:
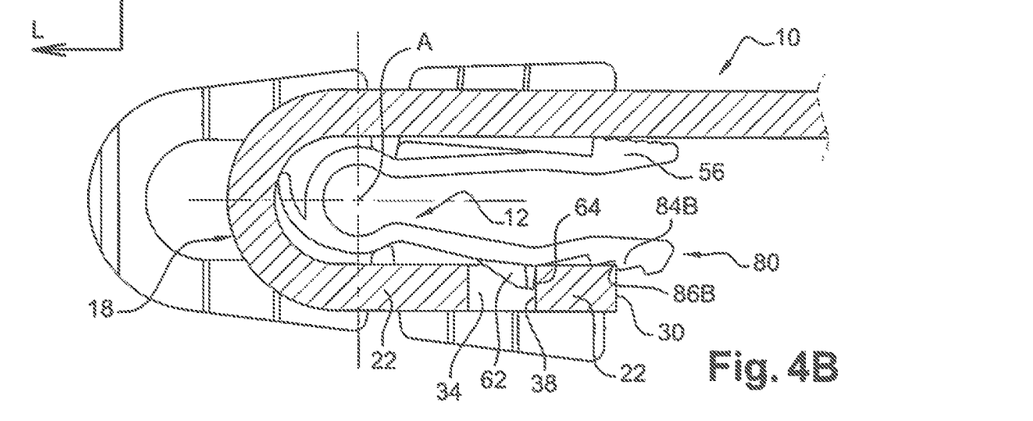
FIGS. 4B and 4C are views analogous to that of FIG. 4A illustrating the same adapter in the mounted position mounted in two wiper arms of different sizes.
Figure 4C:
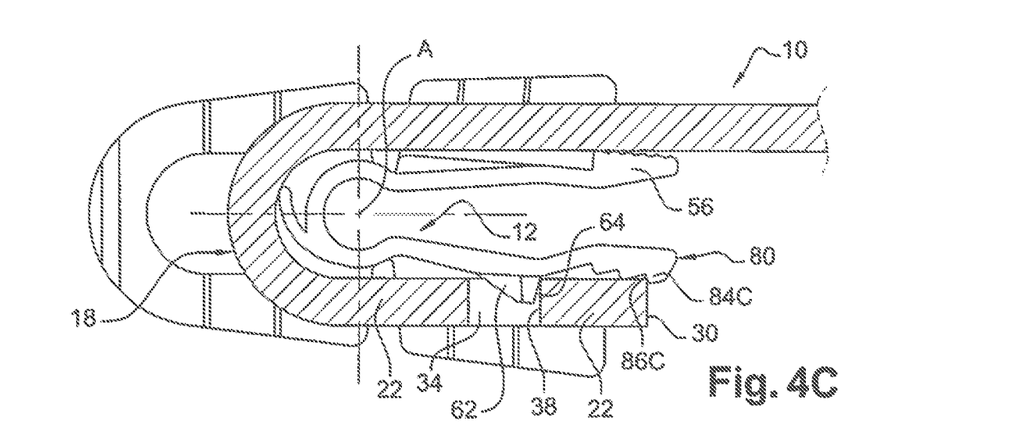

As may be seen in FIGS. 4A to 4C, it is either the notch 84A that collaborates with the transverse end face 30 (FIG. 4A) or the notch 86B (FIG. 4B), or the notch 86C (FIG. 4C) depending on the longitudinal dimensions of the U-shaped hooked end portion 18 of the wiper arm 10.

In each of these three cases, the rear end portion of the lower strand 22 which extends between the rear end edge 38 of the locking slot 34 and the rear transverse end face 30 is received longitudinally without clearance between the convex rear end edge 64 of the locking stud 62 and the associated notch 86A, 86B, or 86C of the positioning tab 80.

Figure 5:
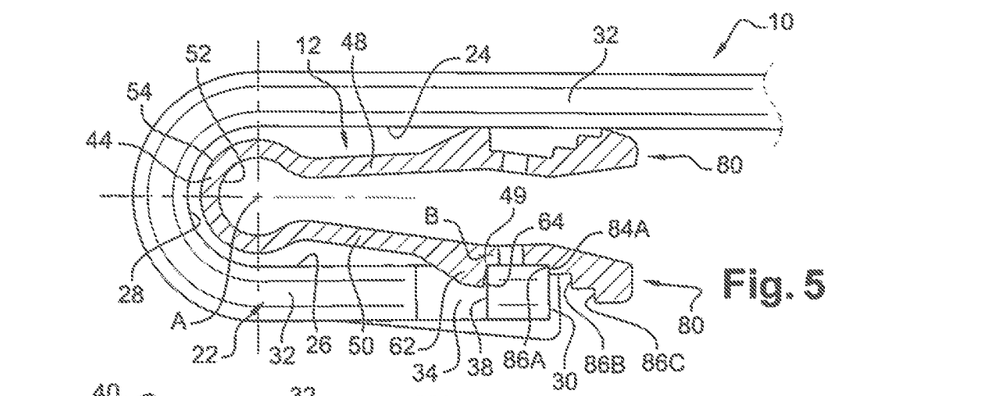
FIG. 5 is a view in section on the plane 5-5 of FIG. 2, which illustrates the adapter in position in the U-shaped hooked end portion of the wiper arm of FIG. 4A.

By way of alternative, in FIG. 5 and in FIG. 2, the rear end part of the upper branch 48 is produced identically and symmetrically with respect to that of the lower branch 50, which means to say that it too is designed in the form of a positioning tab 80 with a staircase profile comprising positioning notches and a locking stud so as to give the adapter 12 a symmetrical structure allowing it to be mounted indifferently either way up.

As may be seen in FIGS. 4A, 4B and 4C, the free end portion of the positioning tab 80 that protrudes more or less longitudinally towards the rear beyond the transverse rear end face 30 of the lower strand 22 makes it possible, as before with the tag 58, to act on the lower branch 50 in order to deform it elastically and extract the locking stud 62 from the locking slot 34 in order to dismantle.

Figure 6A:
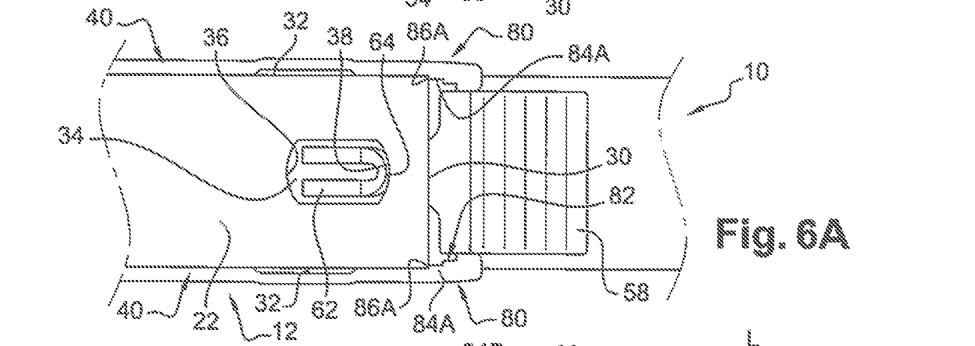
FIGS. 6A to 6C are views analogous to those of FIGS. 4A to 4C illustrating a second embodiment of an adapter according to the invention.
Figure 6B:
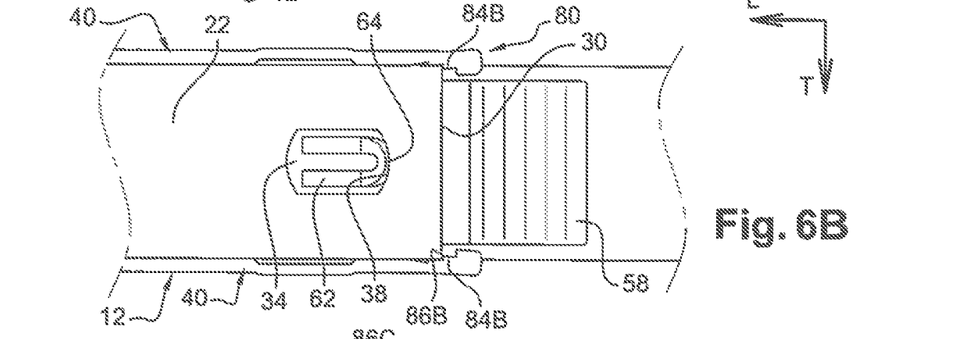
Figure 6C:
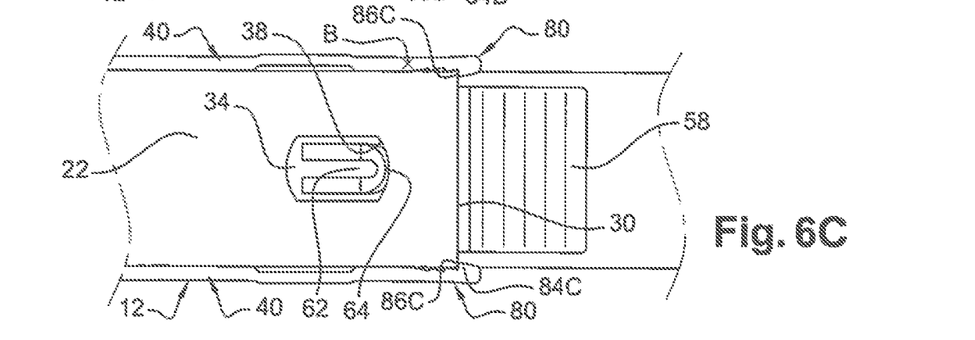

The second embodiment of an adapter 12 according to the invention as illustrated in FIGS. 6A to 6C will now be described.

By comparison with the adapter 12 of the prior art, the notches for the longitudinal positioning of the U-shaped hooked end portion 18 of the wiper arm 10 with respect to the adapter 12 are formed here on at least one positioning tab 80 which extends in a longitudinal and vertical plane in the continuation of a vertical lateral wing 40.

In addition, the dimensions of the adapter according to the invention that allow mounting and assembly with end hooks of different sizes, are small, being more or less the same as those of the adapter according to the state of the art illustrated for example in FIG. 1.

As illustrated, according to the second embodiment, the adapter 12 has overall symmetry of design with respect to a vertical mid plane and thus comprises two positioning tabs 80 each of which extends in the continuation of an associated vertical lateral wing 40.

It is the interior (or internal) longitudinal and vertical face 82 of the positioning tab 80 that has a staircase profile with three steps 84A, 84B, 84C which are offset longitudinally from the front towards the rear relative to one another and transversely relative to one another towards the inside from the front to the rear.

Thus, as before with reference to the first embodiment, it is one or another of the three pairs of notches 86A, 86B or 86C that collaborates with a facing portion of the rear end transverse face 30 of the lower strand 22 according to the dimensions of the U-shaped hooked end portion 18 of the wiper arm 10.

In the various embodiments that have been described and depicted, the locking stud is carded by the branch that is adjacent to the "short" lower strand 22. However, by way of an alternative that has not been illustrated, the single stud may be provided on the other branch of the adapter adjacent to the upper strand 20, the latter then comprising a slot to complement the locking stud.

The invention carp be applied to any type of wiper blade and notably to blades said to be of the "flat blade" type or said to be of the "hybrid" type.

The invention claimed is:

1. An adapter for connecting a wiper blade to a U-shaped front end hook of a wiper arm, the adapter comprising:
    a front body with convex external profile, configured to be received in a concave front closed-end of the end hook;
    at least one branch which extends longitudinally towards the rear from the front body and which carries a single projecting locking stud intended to be received in a locking slot of the end hook, of the wiper arm; and
    at least two transverse notches for the longitudinal positioning of the adapter,
    wherein the at least two notches are longitudinally offset relative to one another,
    wherein one or another of the at least two notches collaborates with a transverse edge of the end hook according to a dimension of the end hook,
    wherein the locking stud is configured to push against the end hook in a first longitudinal direction,
    wherein each notch of the at least two notches comprises a delimiting vertical transverse face, and
    wherein the one or another of the at least two notches has a straight surface that is configured to push against the transverse edge of the end hook in a second longitudinal direction that is opposite the first longitudinal direction.

2. The adapter according to claim 1, further comprising:
    at least one elastically deformable positioning tab,
    wherein the at least two positioning notches are carried by the positioning tab.

3. The adapter according to claim 2, wherein the positioning tab is an elastically deformable beam which pivots about an axis orthogonal to the longitudinal direction.

4. The adapter according to claim 2,
    wherein the positioning tab extends longitudinally towards the rear, and
    wherein the at least two positioning notches are formed near a rear free end of the positioning tab.

5. The adapter according to claim 4, wherein the positioning tab extends longitudinally in the continuation of the said branch that carries the locking stud.

6. The adapter according to claim 5, further comprising:
    two parallel lateral wings between which the front body extends transversely and the mutually-facing internal faces of which are designed to collaborate with external lateral faces of the end hook,
    wherein the said branch and the positioning tab extend longitudinally between the said internal faces.

7. The adapter according to claim 4, further comprising:
    two parallel lateral wings between which the front body extends transversely and the mutually-facing internal faces of which are designed to collaborate with external lateral faces of the end hook,
    wherein the positioning tab extends longitudinally in the continuation of one of the said wings.

8. The adapter according to claim 7, wherein each of the two wings is extended longitudinally towards the rear by a positioning tab.

9. The adapter according to claim 2, wherein each positioning tab carries at least three positioning notches that are longitudinally offset relative to one another.

10. The adapter according to claim 1, wherein the locking stud is delimited by a transverse thrust face oriented longitudinally towards the rear.

11. The adapter according to claim 1, wherein the front body comprises an elastic element configured to be mounted elastically compressed against a facing portion of the concave closed-end of the end hook.

12. The adapter according to claim 1, wherein the adapter is produced as a single piece as a plastic moulding.

13. The adapter according to claim 1, wherein the one or another of the at least two notches is longitudinally co-planar with the locking stud.

14. An assembly comprising:
    a wiper arm comprising a U-shaped front end hook; and
    an adapter that connects a wiper blade to the U-shaped front end hook of the wiper arm, the adapter comprising:
        a front body with convex external profile that is received in a concave front closed-end of the end hook;
        at least one branch which extends longitudinally towards the rear from the front body and which carries a single projecting locking stud that is received in a locking slot of the end hook, of the wiper arm; and
        at least two transverse notches for the longitudinal positioning of the adapter,
        at least one elastically deformable positioning tab,
    wherein the at least two positioning notches are carried by the positioning tab,
    wherein the at least two notches are longitudinally offset relative to one another,
    wherein one or another of the at least two notches collaborates with a transverse edge of the end hook according to a dimension of the end hook,
    wherein the locking stud is configured to push against the end hook in a first longitudinal direction,
    wherein the one or another of the at least two notches has a straight surface that is configured to push against the transverse edge of the end hook in a second longitudinal direction that is opposite the first longitudinal direction, and
    wherein a portion of the end hook of the wiper arm is positioned longitudinally without play between a transverse thrust face oriented longitudinally towards the rear of the locking stud, and one of the said positioning notches.

15. The assembly according to claim 14, wherein the locking slot is delimited longitudinally towards the rear by a transverse edge which is kept by the said at least one elastic tab pressed longitudinally against the transverse thrust face of the locking stud.

16. The assembly according to claim 14, wherein the one or another of the at least two notches is longitudinally co-planar with the locking stud.

\* \* \* \* \*